(Model.)
L. M. HALSEY.
DENTAL GRINDING AND POLISHING WHEEL.
No. 426,994. Patented Apr. 29, 1890.
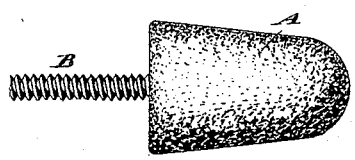
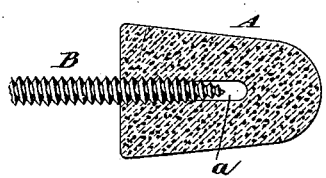
Witnesses:
Charles R. Searle,
Lyndore P. Smith
Inventor:
Louis M. Halsey
By his attorney
Thomas Drew Stetson

UNITED STATES PATENT OFFICE.

LOUIS M. HALSEY, OF BROOKLYN, ASSIGNOR TO THE AMERICAN DENTAL MANUFACTURING COMPANY, OF NEW YORK, N. Y.

DENTAL GRINDING AND POLISHING WHEEL.

SPECIFICATION forming part of Letters Patent No. 426,994, dated April 29, 1890.

Application filed April 20, 1889. Serial No. 307,995. (Model.)

*To all whom it may concern:*

Be it known that I, LOUIS M. HALSEY, a dentist, residing in Brooklyn, Kings county, in the State of New York, have invented a certain new and useful Improvement in Dental Grinding or Polishing Wheels, of which the following is a specification.

The improvement relates to the material from which the wheels are made, giving new and important novel qualities.

It has long been common to polish plates and teeth in dental work by small disks or wheels carrying loose corundum or other fine gritty material. There is a difficulty in finding suitable material for such wheels having sufficient softness to hold the abrading particles and sufficient elasticity to yield and act kindly on the rounded and irregularly-swelled surfaces to be treated combined with the required firmness and strength.

I have discovered that a mechanical mixture of coarsely divided or granulated cork with sufficient india-rubber to induce a firm union strongly compressed in molds and vulcanized possesses the desired qualities and can be produced at such moderate cost as to render it practicable. The fine gritty particles are well retained on the surface, and the action is highly satisfactory.

The accompanying drawings form a part of this specification.

Figure 1 is an elevation of the grinding-wheel mounted on the spindle of an ordinary dental engine. Fig. 2 is a corresponding longitudinal section.

To carry out the invention I sift or otherwise separate from the coarsely-ground cork all the coarsest and finest particles and reject them, using only the medium—say about the size of wheat—and combine therewith about the same amount, by weight, of ordinary raw rubber—say a mixture of equal parts of African with Para rubber—thoroughly masticated and cleaned, and having the proper quantity of sulphur to vulcanize and form a good hard vulcanized rubber. The materials, thoroughly mixed in the kneading-rolls, are then strongly inclosed in molds and compressed by hydraulic or other pressure and secured. It is then exposed to the proper temperature, and the rubber is vulcanized without materially affecting the soft and resilient qualities of the cork. The wheels thus produced may be of all the sizes and forms required in dental operations, and may be mounted on shafts and used in the same manner as other grinding-wheels, with the advantage that emery, corundum, diamond-dust, or other abrasive powder being applied is engaged and retained by the soft surface of my wheels, and is applied to the work with a firmness and elasticity not before attainable. The wheels will endure for a long period.

Referring to the drawings, A is the wheel formed with a hole $a$ concentric to its axis, of such size as to firmly engage the screw-spindle B of any ordinary or suitable dental engine. (Not shown.) It is to be thus mounted for use.

In operating in a small way I took dental rubber, which is raw or unvulcanized but is already provided with the proper quantity of sulphur to produce hard rubber when it is subsequently exposed to sufficient heat for a sufficient time, and, having dissolved it in chloroform, thoroughly wetted the granulated cork with this solution by stirring them together, and then exposed the mass to the air until nearly all the solvent had evaporated, leaving each grain of cork thin-coated and more or less saturated with the rubber in a soft and tacky condition, I filled cavities in a mold with this granulated mass and applied strong pressure by a powerful screw-press until I reduced its volume some fourfold, by which I mean that eight cubic inches was reduced to two cubic inches or thereabout. Then the mold being the proper shape for the grinding-wheel wanted, I held the mold strongly closed and exposed it to a heat of about 320° Fahrenheit for about fifty-five minutes. I have extended the time to two or three hours and observed no change in the compressed cork. It still remained natural cork, simply compressed and confined in shape by the thin but sufficiently strong binding-films of hard rubber. I believe that in these thin shapes hard-rubber composition vulcanizes in a more elastic mass than ordinary hard-rubber articles.

Although I have called the device a "wheel," it will be understood that it may have the form of a sugar-loaf, commonly known in the profession as a "cone," if preferred. I attach much importance to the facts that the rubber is in so small a proportion as to simply hold together the cork, and that vulcanization is conducted at a low temperature, and the cork is introduced originally in its natural state and is not changed therefrom except by the mechanical compression to which it is subject. Carbonized cork or any other form of charcoal will not serve.

I claim as my invention—

A polishing-wheel adapted for dentists' use, consisting of about equal parts, by weight, of granulated cork and rubber thoroughly mixed, molded into the desired shape, and compressed and vulcanized, as herein specified.

In testimony whereof I have hereunto set my hand at Brooklyn, Kings county, this 19th day of April, 1889, in the presence of two subscribing witnesses.

LOUIS M. HALSEY.

Witnesses:
S. C. BETTS,
ALFRED J. HOOK.